United States Patent
Chen et al.

(10) Patent No.: US 11,435,024 B2
(45) Date of Patent: Sep. 6, 2022

(54) REBOUNDING PIVOT MODULE

(71) Applicant: LIANHONG ART CO., LTD., Taoyuan (TW)

(72) Inventors: Chia-Hui Chen, Taoyuan (TW); Tzu-Yu Lin, Taoyuan (TW); Yen-Ting Chen, Taoyuan (TW)

(73) Assignee: LIANHONG ART CO., LTD., Taoyuan (TW)

( * ) Notice: Subject to any disclaimer, the term of this patent is extended or adjusted under 35 U.S.C. 154(b) by 1107 days.

(21) Appl. No.: 16/020,651

(22) Filed: Jun. 27, 2018

(65) Prior Publication Data

US 2020/0003356 A1  Jan. 2, 2020

(51) Int. Cl.
*F16M 11/10* (2006.01)
*E05F 1/12* (2006.01)

(52) U.S. Cl.
CPC ........... *F16M 11/10* (2013.01); *E05F 1/1215* (2013.01); *E05F 1/1223* (2013.01); *E05Y 2201/21* (2013.01); *E05Y 2900/606* (2013.01); *F16M 2200/022* (2013.01); *F16M 2200/041* (2013.01)

(58) Field of Classification Search
CPC ...... F16M 11/10; E05F 1/1215; E05F 1/1223; E05Y 2201/21; E05Y 2900/606
See application file for complete search history.

(56) References Cited

U.S. PATENT DOCUMENTS

| | | | | |
|---|---|---|---|---|
| 5,022,778 A * | 6/1991 | Lu | .......................... | G06F 1/1681 16/337 |
| 7,578,030 B2 * | 8/2009 | Duan | ................... | H04M 1/0216 16/303 |
| 7,699,378 B2 * | 4/2010 | Smith | .................... | B62D 33/03 49/386 |
| 8,254,103 B2 * | 8/2012 | Park | ....................... | G06F 1/1681 16/250 |
| 8,966,715 B1 * | 3/2015 | Chen | ..................... | H04M 1/022 16/303 |

* cited by examiner

*Primary Examiner* — Anita M King
(74) *Attorney, Agent, or Firm* — Guice Patents PLLC

(57) ABSTRACT

A rebounding pivot module includes a mounting shaft, and a bouncing device set including a barrel having one end tooth shaped, a connecting tube mounted in the other end of the barrel, a connection rod connected to the connecting tube, a socket and a first guide block mounted onto the connection rod, the first guide block having one end beveled, a bouncing barrel mounted around the connection rod, a second guide block supported on an elastic member in the bouncing barrel and defining therein a guide hole and having one end tooth shaped and abutted at the beveled edge of the first guide block, and a lock device fastened to connection rod that is inserted through the second guide block, the elastic member and the through hole of the bouncing barrel to lock the bouncing barrel to the connection rod.

9 Claims, 10 Drawing Sheets

REBOUNDING PIVOT MODULE

BACKGROUND OF THE INVENTION

1. Field of the Invention

The present invention relates to pivot technology and more particularly, to a rebounding pivot module.

2. Description of the Related Art

With the evolution of technology, electronic products are becoming lighter and thinner. As a result, tablet computers have been created and launched into the market. Tablet computers have a lighter appearance than normal notebook computers. Tablet computers have their convenience by directly operating the touch screen.

Although tablet computers have the advantages of thin and light appearance, needing not to be attached with an input device such as a keyboard and being convenient to carry, tablet computers do not allow adjustment of the screen to the desired angle for operation like the function of a conventional notebook computer.

Therefore, in order to position the tablet computer at an appropriate angle, the user can often place the tablet computer on a support such as a bookshelf so that the tablet computer can generate a good visual field for operation or viewing. Subsequent conventional technologies have developed many supporting devices suitable for tablet computers in order to improve such operation modes. These supporting devices belong to many different types, such as a support structure similar to a bookshelf, or a support stand structure combined with a tablet computer for allowing the user to adjust the operating angle of the tablet computer.

Although the aforementioned support structures can improve the inconvenience of the use of a tablet computer, these conventional support structure designs have one thing in common: the user needs to control the angle of the support structure by himself and the angle of the support structure must be readjusted every time the user uses it, bringing inconvenience to the user.

SUMMARY OF THE INVENTION

The present invention has been accomplished under the circumstances in view. It is one object of the present invention to provide a rebounding pivot module, which utilizes a relative engagement effect between guide blocks of a bouncing device set to produce a bouncing effect for switching between angles upon rotation, achieving convenient angle adjustment.

To achieve this and other objects of the present invention, a rebounding pivot module comprises a bouncing device set, and a mounting shaft. The bouncing device set comprises a barrel, connecting tube, a connection rod, a socket, a first guide block, a bouncing barrel, an elastic member, a second guide block and a lock device. The barrel has one end thereof tooth shaped. The connecting tube is fixedly mounted in an opposite end of the barrel, having a plug hole in each of two opposite ends thereof. One of the plug holes is affixed to the mounting shaft. The connection rod is accommodated in one end of the barrel, having one end thereof plugged into the other plug hole of the connecting tube and an opposite end thereof suspending outside the connecting tube. The connecting rod comprises a flange extended around the periphery of the one end thereof. The socket is attached onto the opposite end of the connection rod, having one end thereof abutted against the flange of the connection rod and an opposite end tooth shaped. The socket comprises a plurality of engagement grooves defined in the tooth shaped opposite end thereof. The first guide block is attached onto the opposite end of the connection rod to accommodate the socket therein, having one end thereof tooth shaped and aimed at the tooth shaped one end of the barrel and an opposite end thereof beveled. The bouncing barrel has an opening defined in one end thereof and a through hole defined in an opposite end thereof for the passing of the opposite end of the connection rod. The elastic member is inserted through the opening into the inside of the bouncing barrel. The second guide block is inserted through the opening into the inside of the bouncing barrel and linked with the elastic member, comprising a guide hole for the passing of the opposite end of the connection rod, a tooth shaped one end facing toward the beveled opposite end of the first guide block and a plurality of guide edges defined in the tooth shaped one end thereof around the guide hole. The lock device consists of a gasket and a lock nut and is mounted onto the opposite end of the connection rod to lock the bouncing barrel to the connection rod.

Other advantages and features of the present invention will be fully understood by reference to the following specification in conjunction with the accompanying drawings, in which like reference signs denote like elements, components, objects, structures, systems, architectures, means, flows, methods or steps.

DETAILED DESCRIPTION OF THE PREFERRED EMBODIMENT

Figure 1:
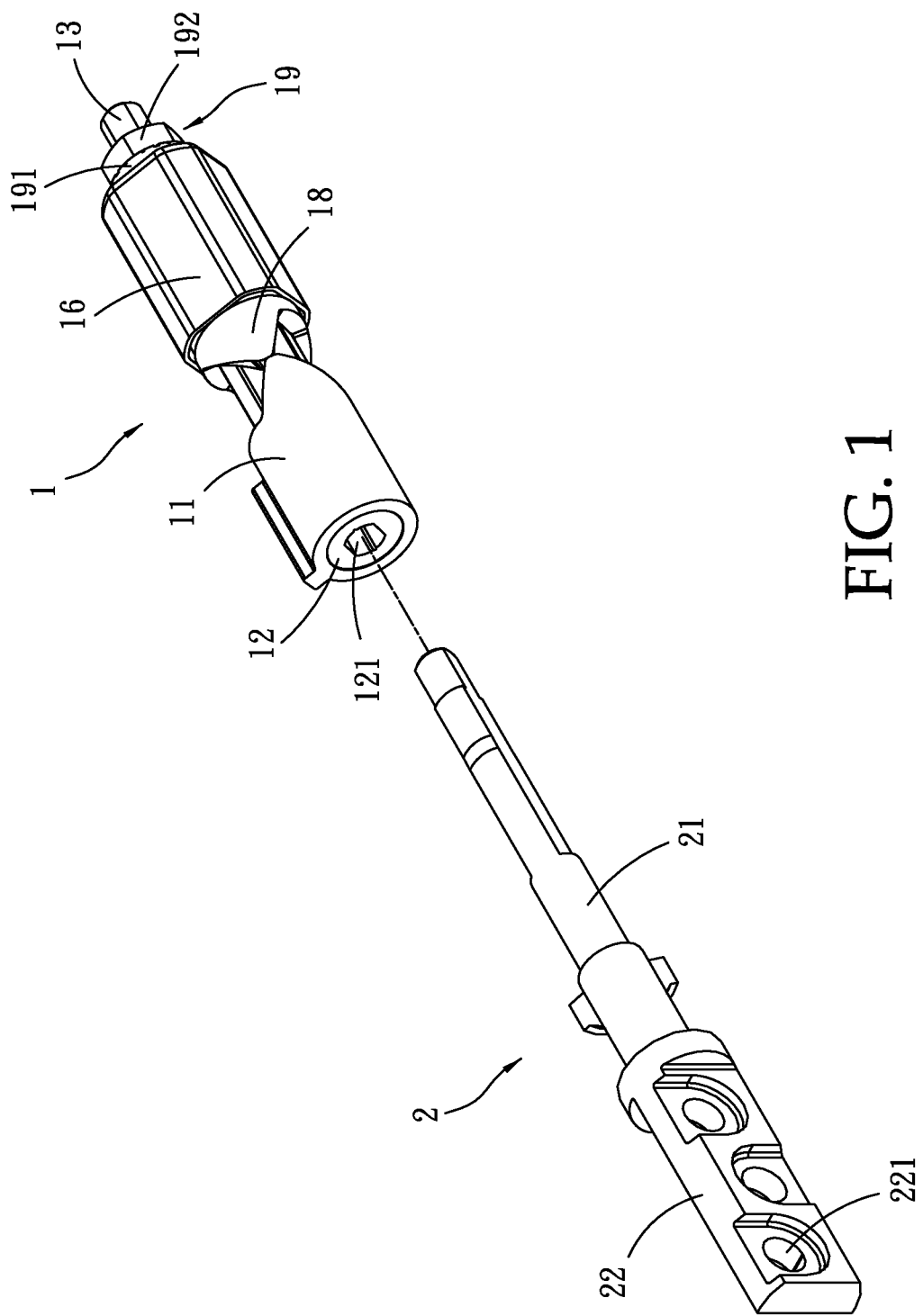
FIG. 1 is an exploded view of a rebounding pivot module in accordance with the present invention.

Referring to FIGS. 3-6, a rebounding pivot module in accordance with the present invention is shown. The rebounding pivot module generally comprises a bouncing device set 1 and a mounting shaft 2. The bouncing device set 1 is connected to the mounting shaft 2. The mounting shaft 2 comprises a shaft body 21, and a mounting plate 22 located at one end of the shaft body 21. In the present preferred embodiment, the mounting plate 22 and the shaft body 21 are integrally made in one piece. The mounting plate 22 provides a plurality of mounting through holes 221 for the insertion of respective fastening members (not shown).

Figure 2:
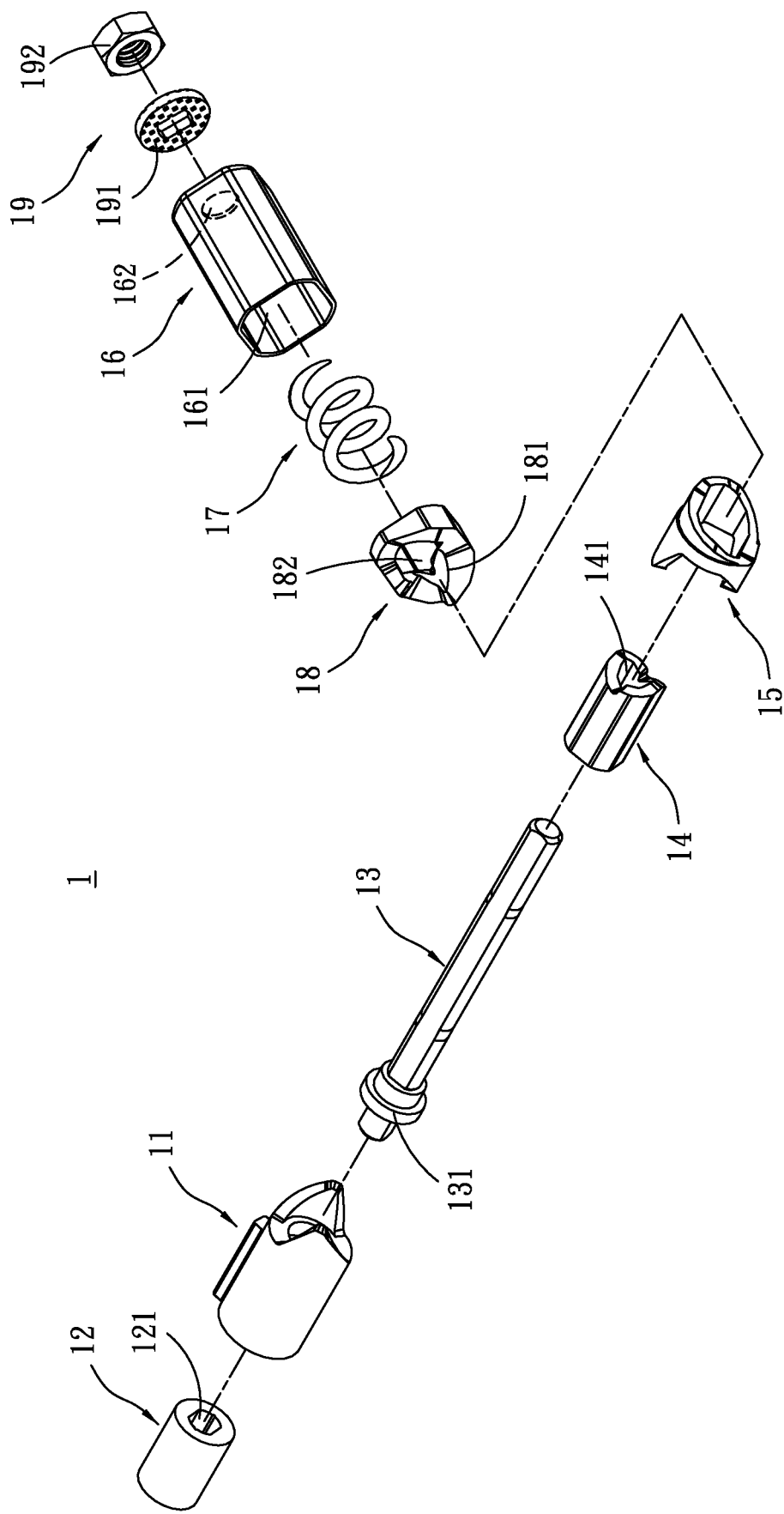
FIG. 2 is an exploded view of the bouncing device set of the rebounding pivot module in accordance with the present invention.

FIG. 2 is an exploded view of the bouncing device set 1. As illustrated, the bouncing device set 1 comprises a barrel 11, connecting tube 12, a connection rod 13, a socket 14, a first guide block 15, a bouncing barrel 16, an elastic member 17, a second guide block 18 and a lock device 19. The barrel 11 is a hollow member. The connecting tube 12 is fixedly accommodated in one end of the barrel 11, having a plug hole 121 located in each of the two opposite ends thereof. These plug holes 121 have a hexagonal cross section. One plug hole 121 accommodates the opposite end of the shaft body 21 of the mounting shaft 2. The opposite end of the shaft body 21 is configured to fit the hexagonal configuration of the plug holes 121 of the connecting tube 12. The opposite end of the barrel 11 is tooth shaped. The connection rod 13 has one end thereof plugged into the other of the plug hole 121 of the connecting tube 12. In the present preferred embodiment, the connection rod 13 is a hexagonal rod fitting the hexagonal configuration of the plug holes 121, having a flange 131 extended around the periphery of the one end thereof that is connected to the connecting tube 12. The socket 14 is attached onto the opposite end of the connection rod 13. In the present preferred embodiment, the outer perimeter of the socket 14 exhibits a polygonal shape, for example, octagonal shape. The socket 14 has one end thereof attached onto the connection rod 13 and abutted against the flange 131, and an opposite end thereof tooth shaped. The toothed shaped opposite end of the socket 14 defines a plurality of engagement grooves 141. The first guide block 15 is attached onto the connection rod 13, having one end thereof tooth shaped. After the first guide block 15 is attached onto the connection rod 13, the socket 14 is accommodated in the tooth shaped end of the first guide block 15 and, the tooth shaped end of the first guide block 15 is aimed at the tooth shaped opposite end of the barrel 11. The opposite end of the first guide block 15 is a beveled end.

Figure 3:
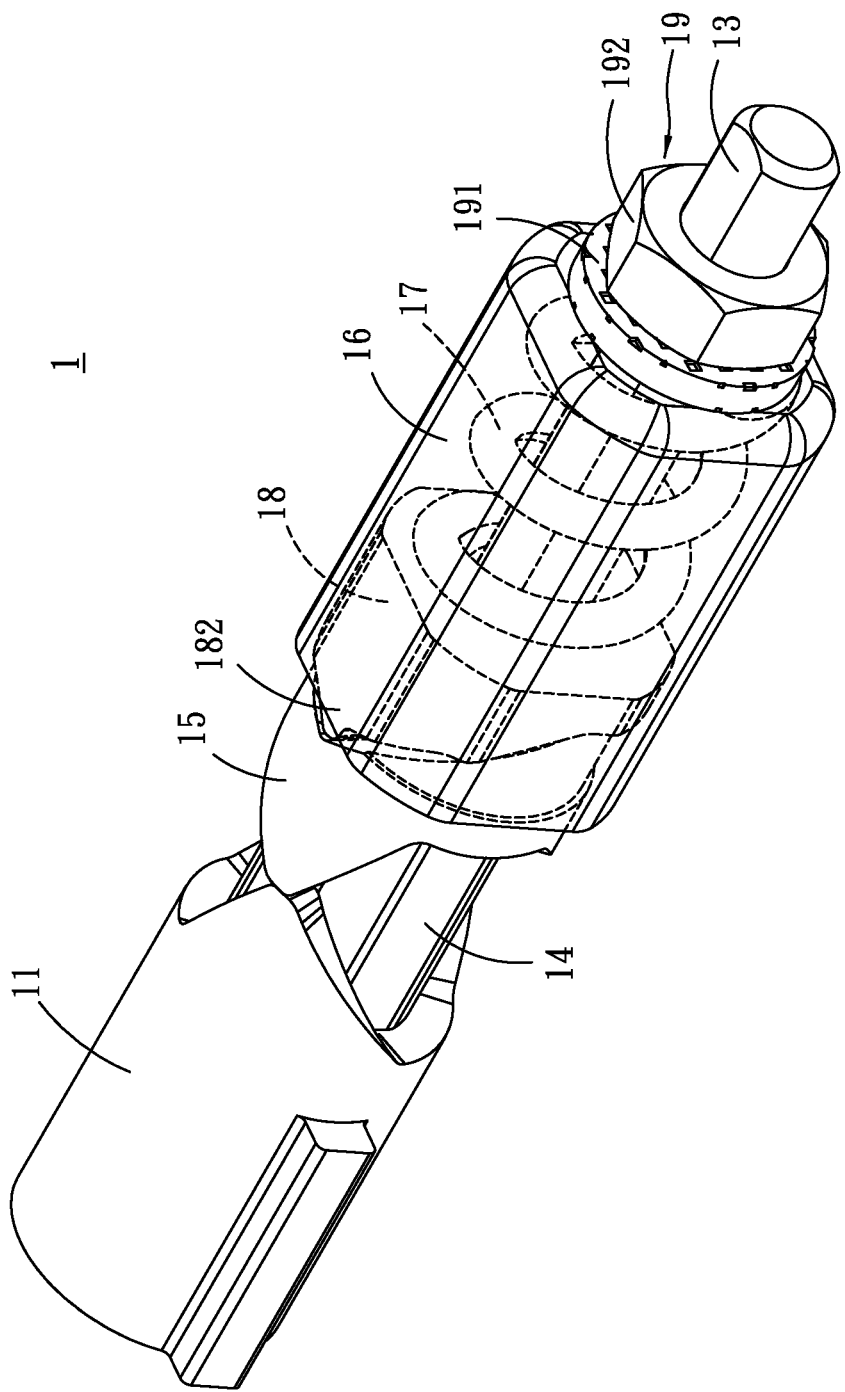
FIG. 3 is an elevational assembly view of the bouncing device set of the rebounding pivot module in accordance with the present invention.

Referring to FIG. 2 again, the bouncing barrel 16 is a hollow member comprising an opening 161 at one end thereof and a through hole 162 at an opposite end thereof. The elastic member 17 and the second guide block 18 are inserted into the opening 161 of the bouncing barrel 16 in a proper order. The second guide block 18 is linked with the elastic member 17. In the present preferred embodiment, the elastic member 17 is a spring. The second guide block 18 defines a guide hole 181. Further, the second guide block 18 has one end thereof tooth shaped and facing toward the beveled opposite end of the first guide block 15. The tooth shaped end of the second guide block 18 defines a plurality of guide edges 182. During mating installation of the bouncing barrel 16 and the barrel 11, the opposite end of the connection rod 13 is inserted in a proper order through the second guide block 18, the elastic member 17, the through hole 162 of the bouncing barrel 16 and then the lock device 19. The lock device 19 comprises a gasket 191 and a lock nut 192. The gasket 191 and the lock nut 192 are mounted onto the connection rod 13 to lock the opposite end of the connection rod 13 to the bouncing barrel 16. FIG. 3 illustrates the bouncing device set 1 assembled.

Figure 4:
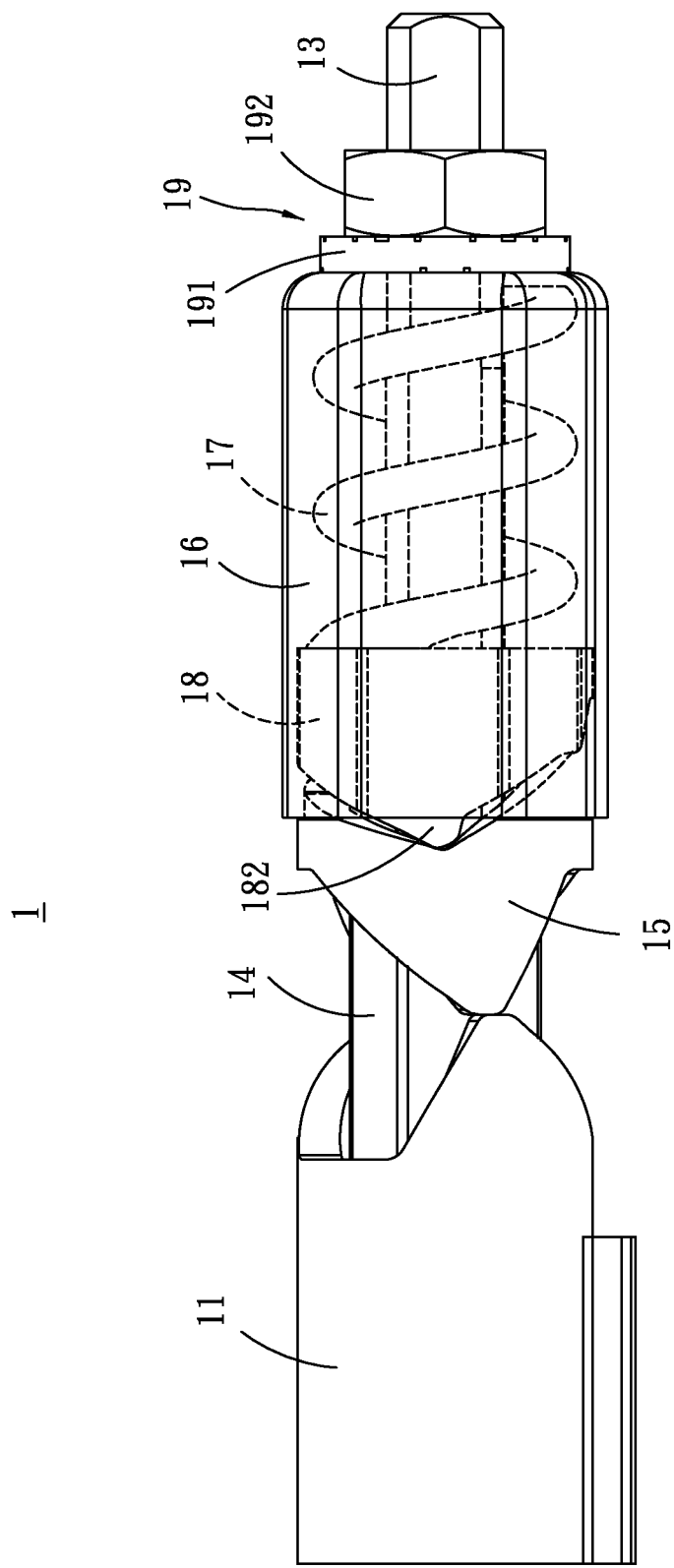
FIG. 4 is a schematic operational side view of the present invention (I).
Figure 5:
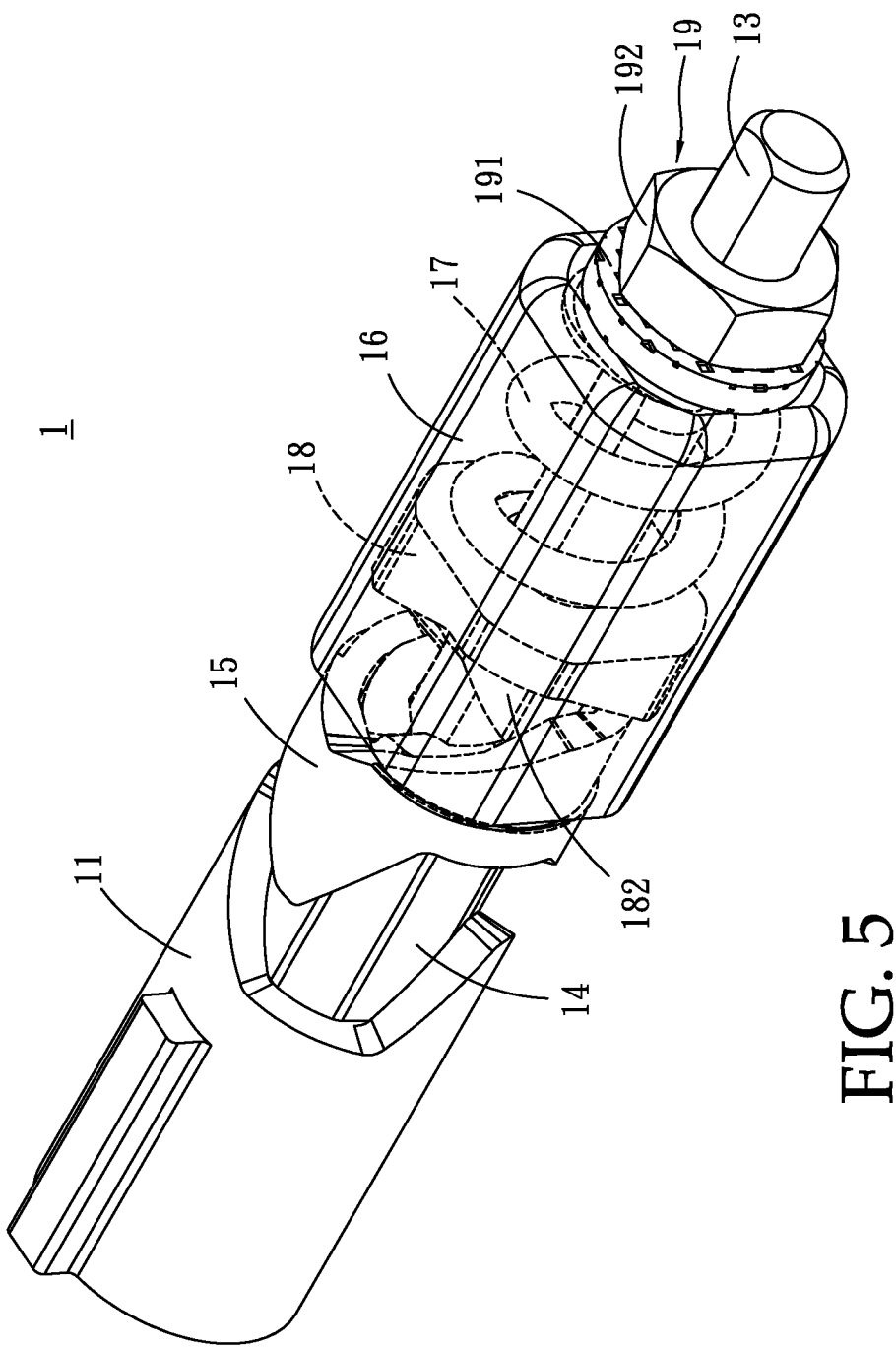
FIG. 5 is a schematic operational side view of the present invention (II).
Figure 6:
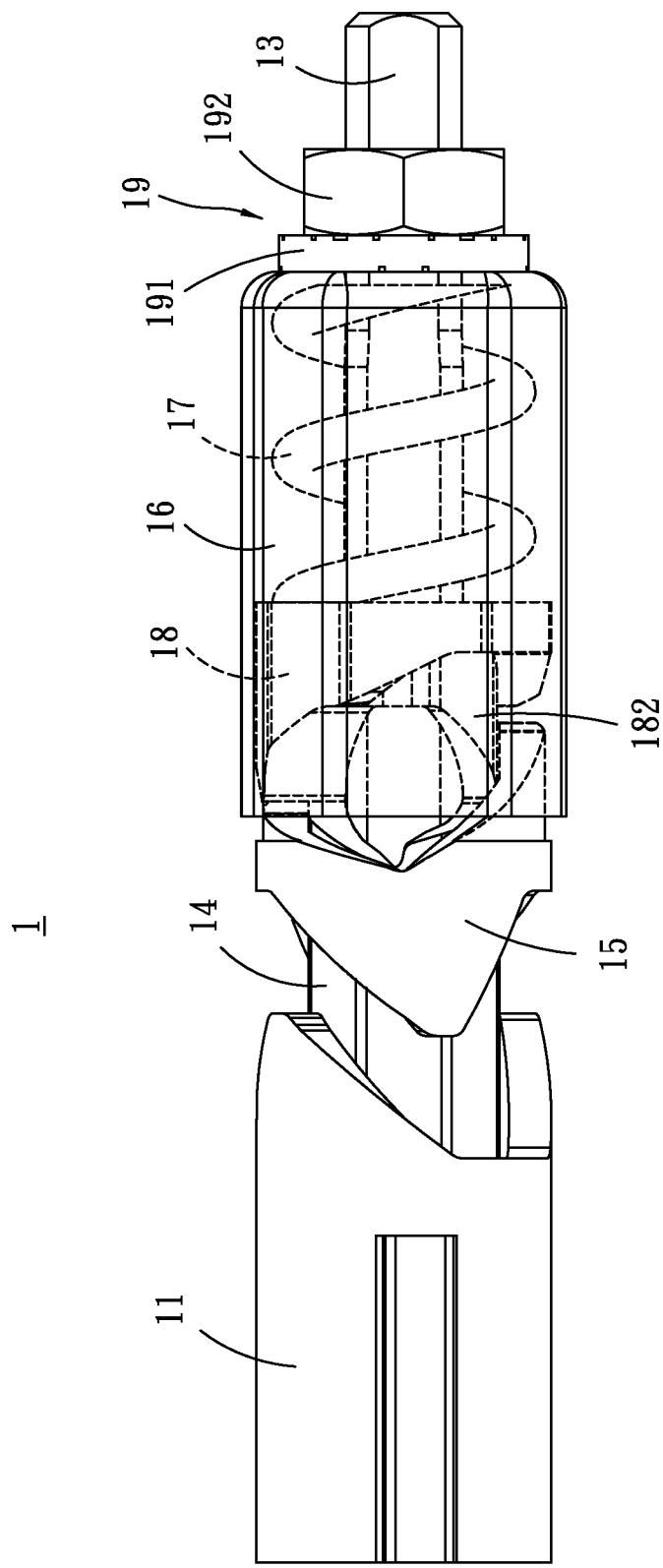
FIG. 6 is a schematic operational side view of the present invention (III).
Figure 7:
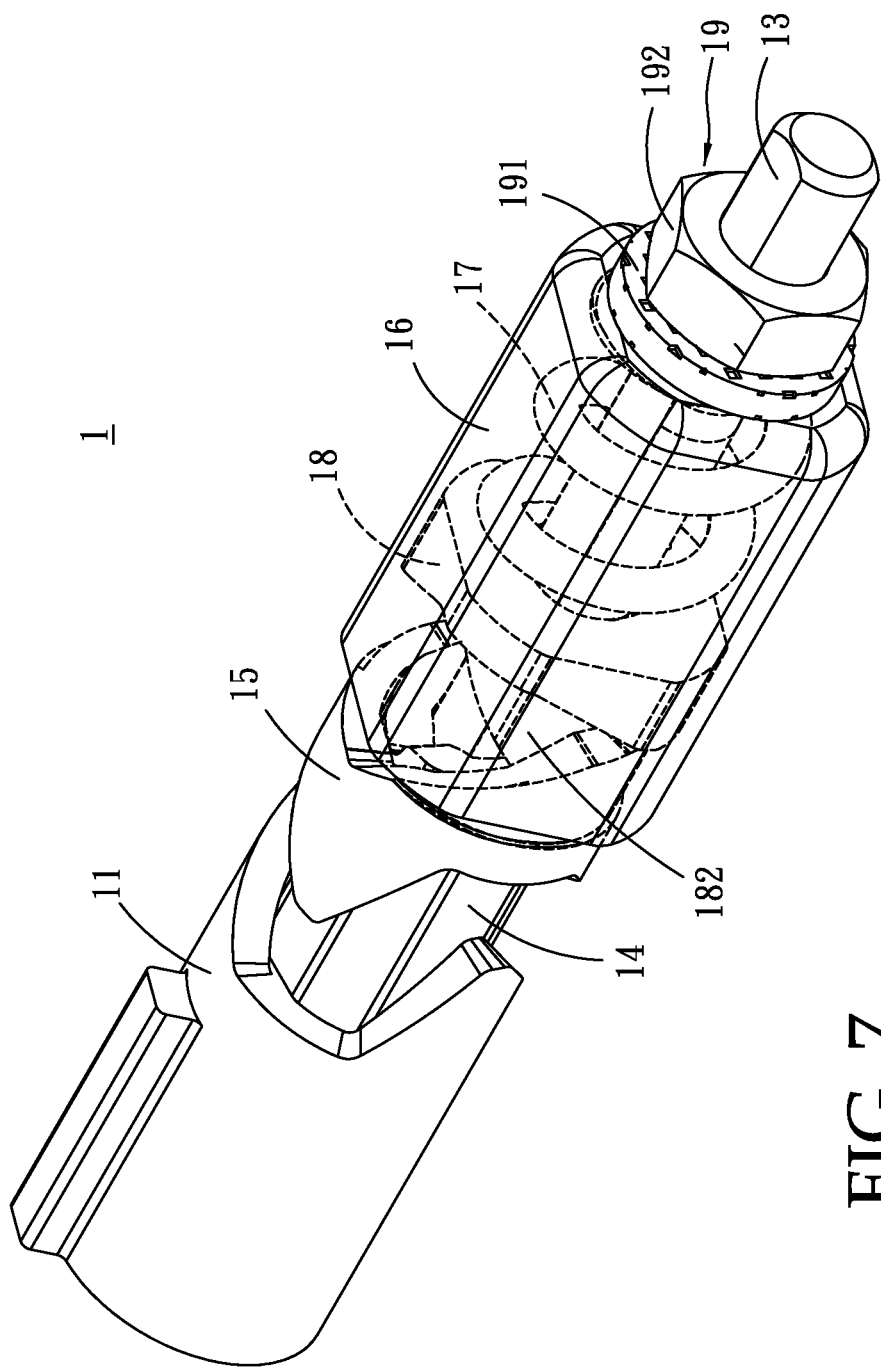
FIG. 7 is a schematic operational side view of the present invention (IV).
Figure 8:
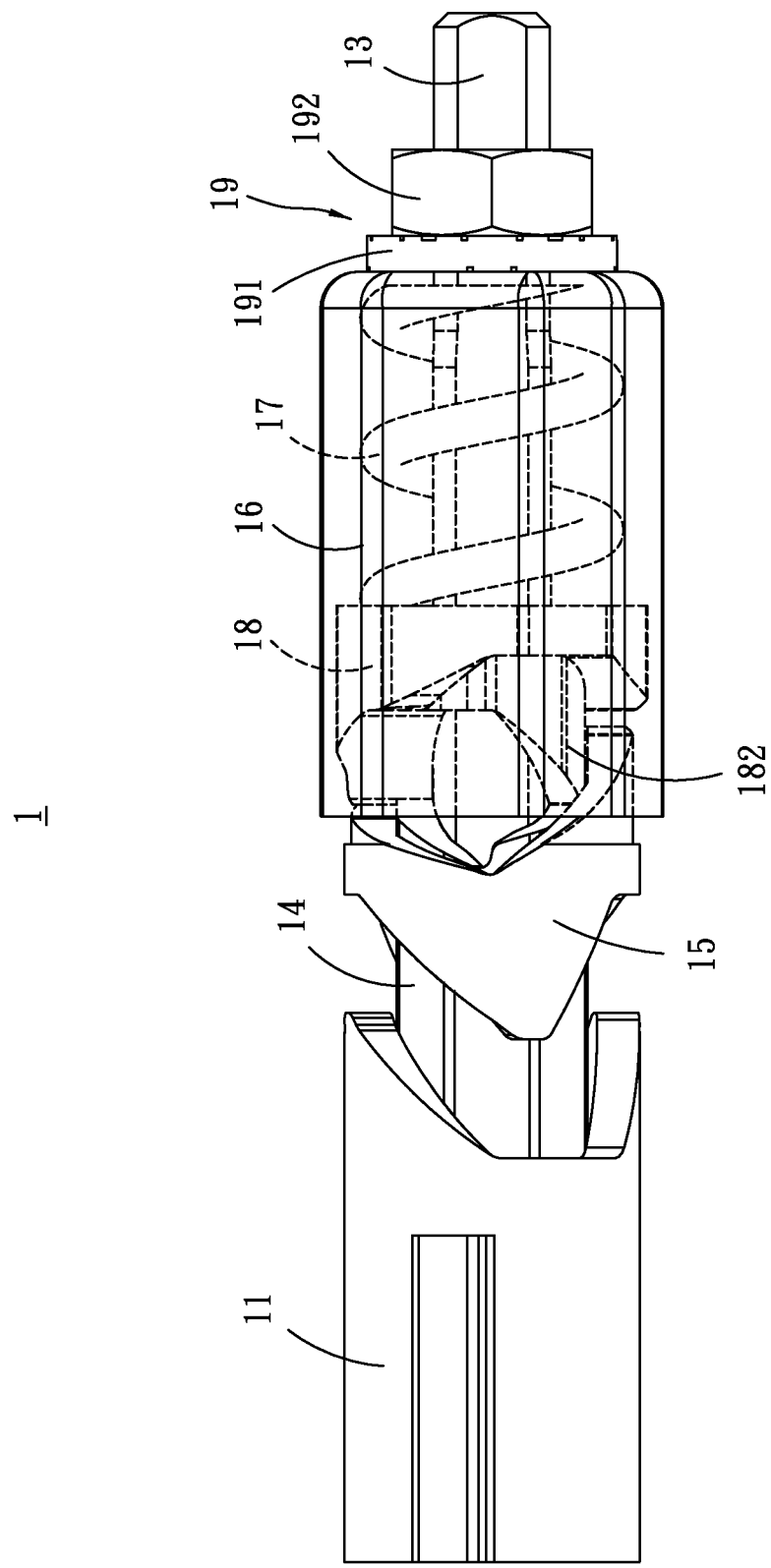
FIG. 8 is a schematic operational side view of the present invention (V).
Figure 9:
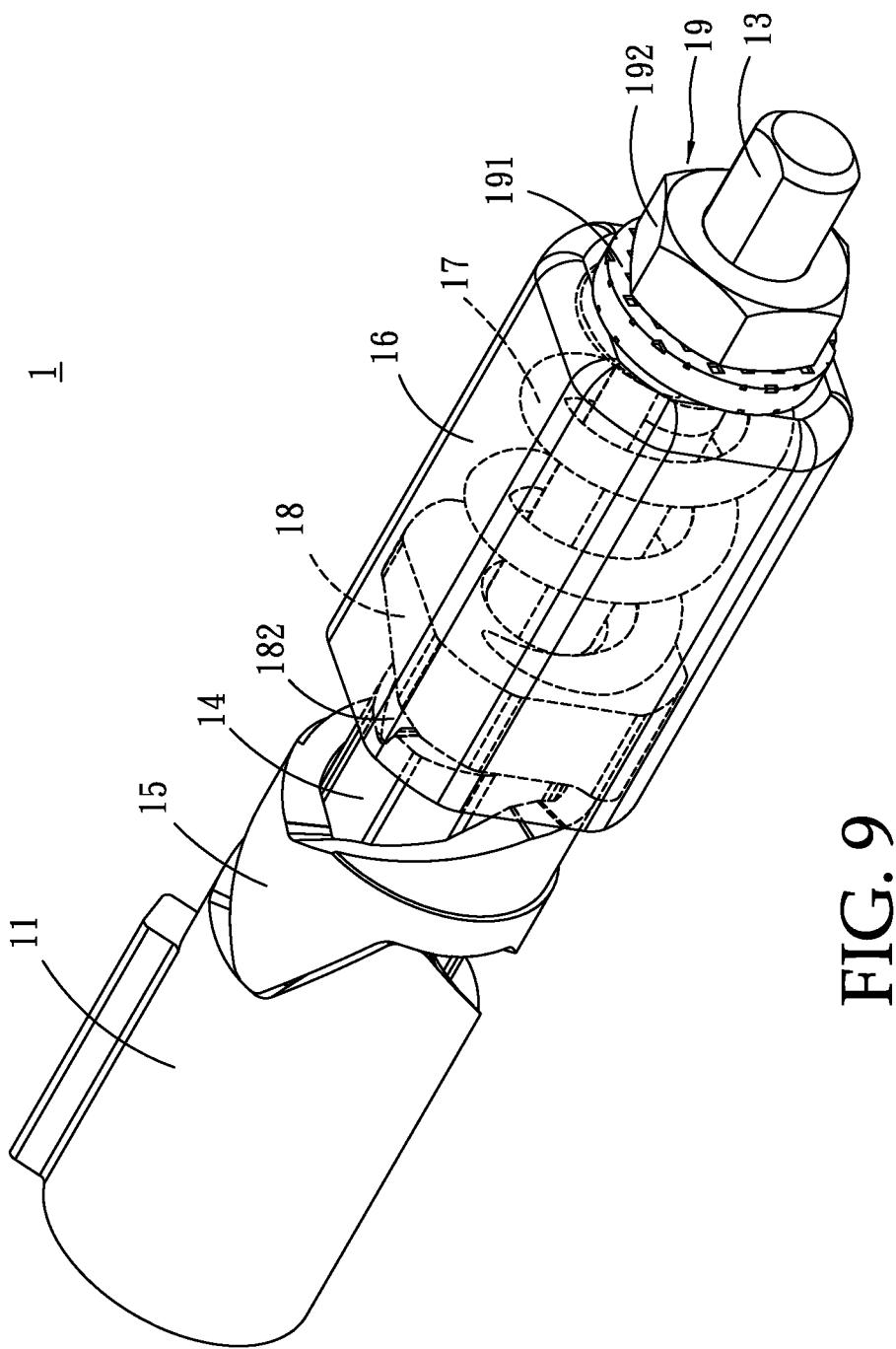
FIG. 9 is a schematic operational side view of the present invention (VI).
Figure 10:
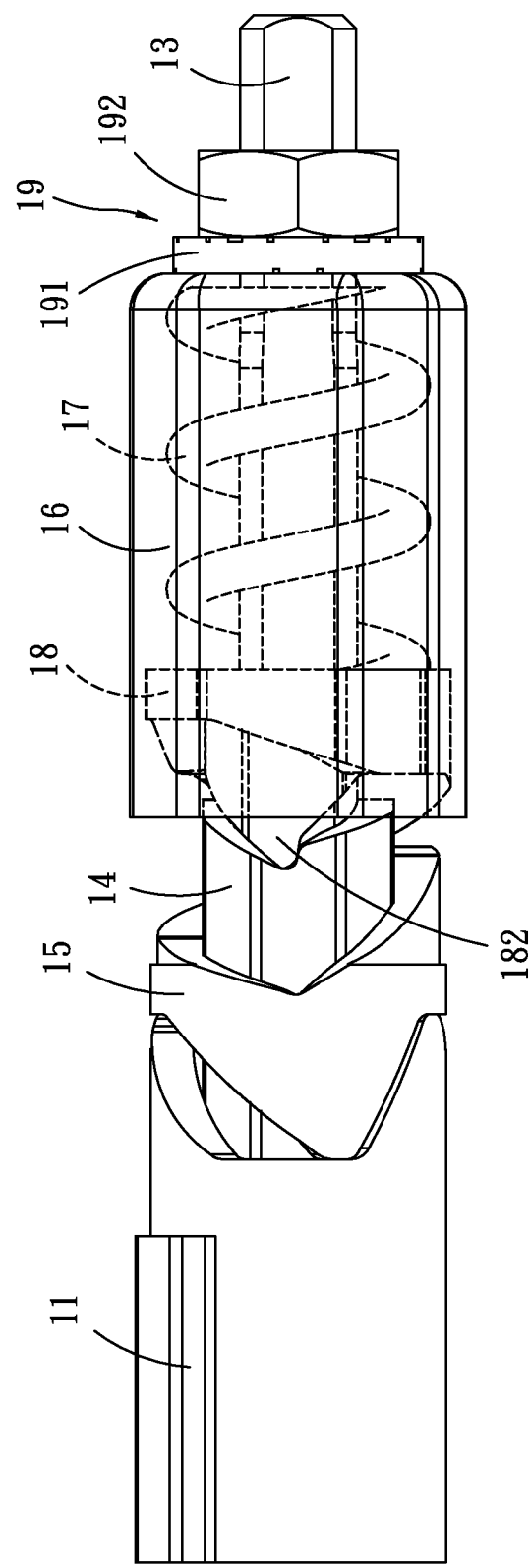
FIG. 10 is a schematic operational side view of the present invention (VII).

Referring to FIGS. 4-10, there are a series of schematic operational side view of the present invention. FIG. 3 shows the first state of the bouncing device set 1, that is, at rest, as shown in FIG. 4, where the peaks of the tooth shaped end of the first guide block 15 are stopped against the respective peaks of the tooth shaped end of the barrel 11 and, the guide edges 182 of the second guide block 18 are stopped at the low side of the beveled end of the first guide block 15. As illustrated in FIG. 5, when the barrel 11 of the bouncing device set 1 is biased by an external force, the peaks of the tooth shaped end of the first guide block 15 are moved away from the respective peaks of the toothed end of the barrel 11, the guide edges 182 of the second guide block 18 are moved from the low side of the beveled end of the first guide block 15 toward the high side thereof to compress the elastic member 17, as illustrated in FIG. 6, and thus, the first guide block 15 is moved along the tooth shaped end of the barrel 11 till that the bouncing device set 1 is rotated to a first angular position. After the guide edges 182 of the second guide block 18 passed over the high side of the beveled end of the first guide block 15, the bouncing device set 1 is rotated into a second angular position, as illustrated in FIG. 7, finally, the guide edges 182 of the second guide block 18 are moved into the respective engagement grooves 141 of the socket 14 to lock the bouncing device set 1 in position, as shown in FIG. 8. On the contrary, if the bouncing device set 1 is rotated by an external force through an angle smaller than the second angle, the guide edges 182 of the second guide block 18 are moved away from the engagement grooves 141 of the socket 14 to drive in the reversed direction, as illustrated in FIG. 9, causing the second guide block 18 to push the first guide block 15 back to the low side of the tooth shaped end of the barrel 11, at this time, the elastic member 17 of the bouncing device set 1 imparts an elastic restoring energy in the reversed direction, causing rotation of the bouncing device set 1 through an angle smaller than the first angle, at final, the bouncing device set 1 returns to the initial position and, the first guide block 15 and the second guide block 18 are returned to the initial position and locked thereto.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A rebounding pivot module, comprising a bouncing device set, said bouncing device set comprising:
   a barrel having one end thereof tooth shaped;
   a connecting tube fixedly mounted in an opposite end of said barrel, said connecting tube comprising a plug hole in each of two opposite ends thereof;
   a connection rod accommodated in one end of said barrel, said connection rod having one end thereof plugged into one said plug hole of said connecting tube and an opposite end thereof suspending outside said connecting tube, said connecting rod comprising a flange extended around the periphery of the said one end thereof;
   a socket attached onto the opposite end of said connection rod, said socket having one end thereof abutted against said flange of said connection rod and an opposite end tooth shaped, said socket comprising a plurality of engagement grooves defined in the tooth shaped opposite end thereof;
   a first guide block attached onto the opposite end of said connection rod to accommodate said socket therein, said first guide block having one end thereof tooth shaped and aimed at the tooth shaped one end of said barrel and an opposite end thereof beveled;
   a bouncing barrel having an opening defined in one end thereof and a through hole defined in an opposite end thereof for the passing of the opposite end of said connection rod;

an elastic member inserted through said opening into the inside of said bouncing barrel;

a second guide block inserted through said opening into the inside of said bouncing barrel and linked with said elastic member, said second guide block comprising a guide hole for the passing of the opposite end of said connection rod, a tooth shaped one end facing toward the beveled opposite end of said first guide block and a plurality of guide edges defined in the tooth shaped one end thereof around said guide hole; and a lock device mounted onto the opposite end of said connection rod to lock said bouncing barrel to said connection rod.

2. The rebounding pivot module as claimed in claim 1, further comprising a mounting shaft, said mounting shaft comprising a shaft body having one end thereof plugged into the other said plug hole of said connecting tube, a mounting plate located at an opposite end of said shaft body and a plurality of mounting through holes cut through said mounting plate.

3. The rebounding pivot module as claimed in claim 2, wherein said mounting plate and said shaft body are integrally made in one piece.

4. The rebounding pivot module as claimed in claim 1, wherein said plug holes of said connecting tube are hexagonal holes.

5. The rebounding pivot module as claimed in claim 4, wherein said shaft body of said mounting shaft is configured to fit the configuration of said plug holes.

6. The rebounding pivot module as claimed in claim 4, wherein said connection rod has the periphery thereof configured to fit the configuration of said plug hole.

7. The rebounding pivot module as claimed in claim 1, wherein said socket has the outer perimeter thereof configured to exhibit a polygonal configuration.

8. The rebounding pivot module as claimed in claim 1, wherein said socket exhibits an octagonal configuration.

9. The rebounding pivot module as claimed in claim 1, wherein said lock device comprises a gasket mounted onto the opposite end of said connection rod and a lock nut mounted onto the opposite end of said connection rod to lock said bouncing barrel to said connection rod.

* * * * *